United States Patent
Agrawal et al.

(10) Patent No.: US 12,057,969 B1
(45) Date of Patent: *Aug. 6, 2024

(54) SYSTEM AND METHOD FOR LOAD BALANCING ENDPOINT TRAFFIC TO MULTIPLE SECURITY APPLIANCES ACTING AS DEFAULT GATEWAYS WITH POINT-TO-POINT LINKS BETWEEN ENDPOINTS

(71) Applicant: AIRGAP NETWORKS INC., Santa Clara, CA (US)

(72) Inventors: Ritesh R. Agrawal, San Jose, CA (US); Vinay Adavi, Sunnyvale, CA (US); Satish M. Mohan, San Jose, CA (US)

(73) Assignees: Airgap Networks, Inc., Santa Clara, CA (US); Zscaler, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,647

(22) Filed: Dec. 5, 2023

Related U.S. Application Data

(63) Continuation-in-part of application No. 18/346,078, filed on Jun. 30, 2023, which is a continuation-in-part
(Continued)

(51) Int. Cl.
*H04L 12/46* (2006.01)
*H04L 47/125* (2022.01)
(Continued)

(52) U.S. Cl.
CPC ........ *H04L 12/4641* (2013.01); *H04L 47/125* (2013.01); *H04L 67/1023* (2013.01); *H04L 67/1036* (2013.01); *H04L 69/40* (2013.01)

(58) Field of Classification Search
None
See application file for complete search history.

(56) References Cited

U.S. PATENT DOCUMENTS 6,611,925 B1    8/2003  Spear
6,914,905 B1 *  7/2005  Yip ........................ H04L 45/00
                                                 370/395.53
(Continued)

FOREIGN PATENT DOCUMENTS

CA       2826385 A1    8/2012
CN     109450959 A     3/2019
(Continued)

OTHER PUBLICATIONS

Thapa, Manish, "Mitigating Threats in IoT Network Using Device Isolation", Maste• s Thesis, Feb. 4, 2018, 73 pgs.
(Continued)

*Primary Examiner* — Brandon Hoffman
(74) *Attorney, Agent, or Firm* — Baratta Law PLLC; Lawrence A. Baratta, Jr.

(57) ABSTRACT

A technique to stop lateral movement of ransomware between endpoints in a VLAN is disclosed. A security appliance is set as the default gateway for intra-LAN communication by overwriting the DHCP responses. A high availability cluster of the gateways is utilized to distribute traffic and implement load balancing amongst the gateways.

18 Claims, 13 Drawing Sheets

Related U.S. Application Data of application No. 18/064,177, filed on Dec. 9, 2022, now Pat. No. 11,916,957, which is a continuation-in-part of application No. 17/521,092, filed on Nov. 8, 2021, which is a continuation of application No. 17/387,615, filed on Jul. 28, 2021, now Pat. No. 11,323,474, and a continuation of application No. 17/357,757, filed on Jun. 24, 2021, now Pat. No. 11,171,985.

(51) Int. Cl.
*H04L 67/1023* (2022.01)
*H04L 67/1036* (2022.01)
*H04L 69/40* (2022.01)

(56) References Cited

U.S. PATENT DOCUMENTS

| | | | |
|---|---|---|---|
| 8,055,800 | B1 | 11/2011 | Bardzil et al. |
| 8,312,270 | B1 | 11/2012 | Chou |
| 8,347,349 | B1 | 1/2013 | Wilson |
| 8,683,052 | B1 | 3/2014 | Brinskelle |
| 8,850,185 | B1 | 9/2014 | Vaughn |
| 8,869,259 | B1 | 10/2014 | Udupa |
| 9,225,736 | B1 | 12/2015 | Roundy |
| 9,282,114 | B1 | 3/2016 | Dotan |
| 9,306,965 | B1 | 4/2016 | Grossman et al. |
| 9,602,529 | B2 * | 3/2017 | Jones ............... H04L 63/1433 |
| 9,712,504 | B2 | 7/2017 | Kurmala |
| 9,756,061 | B1 | 9/2017 | Roeh |
| 10,298,599 | B1 | 5/2019 | Zhang |
| 10,454,950 | B1 | 10/2019 | Aziz |
| 11,030,311 | B1 | 6/2021 | Lopez |
| 11,093,139 | B1 * | 8/2021 | Karr ............... G06F 3/0685 |
| 11,171,985 | B1 | 11/2021 | Agrawal |
| 11,240,242 | B1 | 2/2022 | Celik |
| 11,252,183 | B1 | 2/2022 | Agrawal |
| 11,303,669 | B1 | 4/2022 | Agrawal |
| 11,303,673 | B1 | 4/2022 | Agrawal |
| 11,323,474 | B1 | 5/2022 | Agrawal |
| 11,374,964 | B1 | 6/2022 | Agrawal |
| 11,818,176 | B1 | 11/2023 | Wu |
| 2003/0212907 | A1 | 11/2003 | Genty |
| 2006/0028996 | A1 | 2/2006 | Huegen |
| 2007/0101432 | A1 | 5/2007 | Carpenter |
| 2008/0184157 | A1 | 7/2008 | Selig |
| 2009/0217346 | A1 | 8/2009 | Manring |
| 2009/0328209 | A1 | 12/2009 | Nachenberg |
| 2010/0281159 | A1 | 11/2010 | Boscolo |
| 2012/0079122 | A1 | 3/2012 | Brown |
| 2013/0298242 | A1 | 11/2013 | Kumar |
| 2014/0020053 | A1 | 1/2014 | Kay |
| 2014/0059642 | A1 | 2/2014 | Deasy |
| 2015/0281172 | A1 | 10/2015 | He |
| 2016/0197962 | A1 | 7/2016 | Winn |
| 2016/0323318 | A1 | 11/2016 | Terrill et al. |
| 2017/0039310 | A1 | 2/2017 | Wang |
| 2017/0085530 | A1 | 3/2017 | Volkov |
| 2017/0093910 | A1 | 3/2017 | Gukal |
| 2017/0149775 | A1 | 5/2017 | Bachar et al. |
| 2017/0289134 | A1 | 10/2017 | Bradley |
| 2017/0289191 | A1 | 10/2017 | Thioux |
| 2017/0339190 | A1 | 11/2017 | Epstein |
| 2017/0339250 | A1 | 11/2017 | Momchilov |
| 2017/0344743 | A1 | 11/2017 | Shi |
| 2018/0013788 | A1 | 1/2018 | Vissamsetty |
| 2018/0097840 | A1 | 4/2018 | Murthy |
| 2018/0124085 | A1 | 5/2018 | Frayman |
| 2018/0189508 | A1 | 7/2018 | Li |
| 2018/0324201 | A1 | 11/2018 | Lowry |
| 2019/0116193 | A1 | 4/2019 | Wang |
| 2019/0166152 | A1 | 5/2019 | Steele |
| 2019/0245831 | A1 | 8/2019 | Petit |
| 2019/0253432 | A1 | 8/2019 | Ohtani |
| 2019/0312836 | A1 | 10/2019 | Phillips |
| 2019/0332765 | A1 | 10/2019 | Fu |
| 2020/0137110 | A1 | 4/2020 | Tyler |
| 2020/0145416 | A1 | 5/2020 | Mitzimberg |
| 2020/0228547 | A1 | 7/2020 | Kottapalli |
| 2020/0356664 | A1 | 11/2020 | Maor |
| 2020/0404007 | A1 | 12/2020 | Singh |
| 2021/0058395 | A1 | 2/2021 | Jakobsson |
| 2021/0136037 | A1 | 5/2021 | Balasubramaniam |
| 2021/0152595 | A1 * | 5/2021 | Hansen ............... G06F 21/568 |
| 2021/0160275 | A1 | 5/2021 | Anderson |
| 2021/0194894 | A1 | 6/2021 | Anderson |
| 2021/0218770 | A1 | 7/2021 | Ben-Yosef |
| 2021/0264233 | A1 | 8/2021 | Gronat |
| 2021/0273953 | A1 | 9/2021 | Fellows |
| 2021/0280315 | A1 | 9/2021 | Woldenberg |
| 2021/0336933 | A1 | 10/2021 | Shah |
| 2021/0344667 | A1 | 11/2021 | Huston, III |
| 2021/0400057 | A1 | 12/2021 | Devane |
| 2022/0029965 | A1 | 1/2022 | Chanak |
| 2022/0060498 | A1 | 2/2022 | Head, Jr. |
| 2022/0217133 | A1 | 7/2022 | Montgomery |
| 2022/0217169 | A1 | 7/2022 | Varanda |
| 2022/0229906 | A1 | 7/2022 | Balek |
| 2022/0329585 | A1 | 10/2022 | Chhabra |
| 2022/0360983 | A1 | 11/2022 | Raman |
| 2022/0368689 | A1 | 11/2022 | Ben-Noon |
| 2022/0393943 | A1 | 12/2022 | Pangeni |
| 2022/0398321 | A1 | 12/2022 | Baldwin |
| 2022/0408255 | A1 | 12/2022 | Howe |
| 2023/0079444 | A1 | 3/2023 | Parla |
| 2023/0247003 | A1 | 8/2023 | Chanak |
| 2023/0308458 | A1 | 9/2023 | Varsanyi |

FOREIGN PATENT DOCUMENTS

| | | |
|---|---|---|
| CN | 114143034 A | 3/2022 |
| CN | 115396230 A | 11/2022 |
| EP | 1844399 B1 | 6/2019 |
| TW | M623435 | 2/2022 |
| WO | 2005125084 A1 | 12/2005 |
| WO | 2008074621 A1 | 6/2008 |
| WO | 2016191376 A1 | 12/2016 |
| WO | 2018157247 A1 | 9/2018 |
| WO | 2021009645 A1 | 1/2021 |

OTHER PUBLICATIONS

International Search Report and Written Opinion for PCT/US2020/020593, mailed Apr. 15, 2020, 8 pgs.

International Preliminary Report on Patentability for PCT/US2020/020593, Completed May 18, 2021, 8 pgs.

* cited by examiner

SYSTEM AND METHOD FOR LOAD BALANCING ENDPOINT TRAFFIC TO MULTIPLE SECURITY APPLIANCES ACTING AS DEFAULT GATEWAYS WITH POINT-TO-POINT LINKS BETWEEN ENDPOINTS

CROSS REFERENCE TO RELATED APPLICATIONS

This application is a continuation in part of U.S. patent application Ser. No. 18/346,078, filed Jun. 30, 2023, entitled "System and Method for Utilizing DHCP Relay to Accomplish Quarantining Client Endpoints in a Ransomware Protected Network", which is a continuation-in-part of U.S. patent application Ser. No. 18/064,177, filed Dec. 9, 2022, now issued as U.S. Pat. No. 11,916,957 on Feb. 27, 2024, which is a continuation-in-part of U.S. patent application Ser. No. 17/521,092, filed Nov. 8, 2021, entitled "System and Method to Detect Lateral Movement of Ransomware by Deploying a Security Appliance Over a Shared Network to Implement a Default Gateway with Point-To-Point Links Between Endpoints", which is a continuation of U.S. patent application Ser. No. 17/357,757, filed Jun. 24, 2021, now issued as U.S. Pat. No. 11,171,985 on Nov. 9, 2021, entitled "System and Method to Detect Lateral Movement of Ransomware by Deploying a Security Appliance Over a Shared Network to Implement a Default Gateway with Point-To-Point Links Between Endpoints" and a continuation of U.S. patent application Ser. No. 17/387,615, filed Jul. 28, 2021, now issued as U.S. Pat. No. 11,323,474 on May 3, 2022, entitled "System and Method for Determining Endpoint Compatibility with Subnet Prefix of All Ones for Lateral Propagation Prevention of Ransomware", which are hereby incorporated by reference in their entirety.

FIELD OF THE INVENTION

The present disclosure generally relates to techniques for ransomware protection. Using security applicants acting as default gateways to provide lateral movement protection from Ransomware in environments such as shared VLAN environments.

BACKGROUND

Ransomware is one of the biggest threats facing the security industry today. Ransomware is a form of malware that infects computer systems. Ransomware is becoming an increasing problem in the computer/network security industry. Ransomware infects a computer system and encrypts files. A ransom is demanded in exchange for a decryption key.

Conventional enterprise security solutions have proved to be inadequate in view of the high-profile ransomware cases of large companies such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software application on endpoint devices provides only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

SUMMARY

A cluster of secure access gateways are operated as a high available cluster. Each individual gateway is implemented using a security appliance to form a default gateway with point-to-point links for a set of endpoint devices. In response to a failure of an active gateway, the traffic can be reassigned to other active gateways.

In one implementation, a smart appliance includes a DHCP relay function. The smart appliance is set as the default gateway for intra-LAN communication for two or more endpoint devices. A subnet mask of 255.255.255.255 is used to set the security appliance as a default gateway for a plurality of endpoint devices of the shared VLAN environment.

It should be understood, however, that this list of features and advantages is not all-inclusive, and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 12:
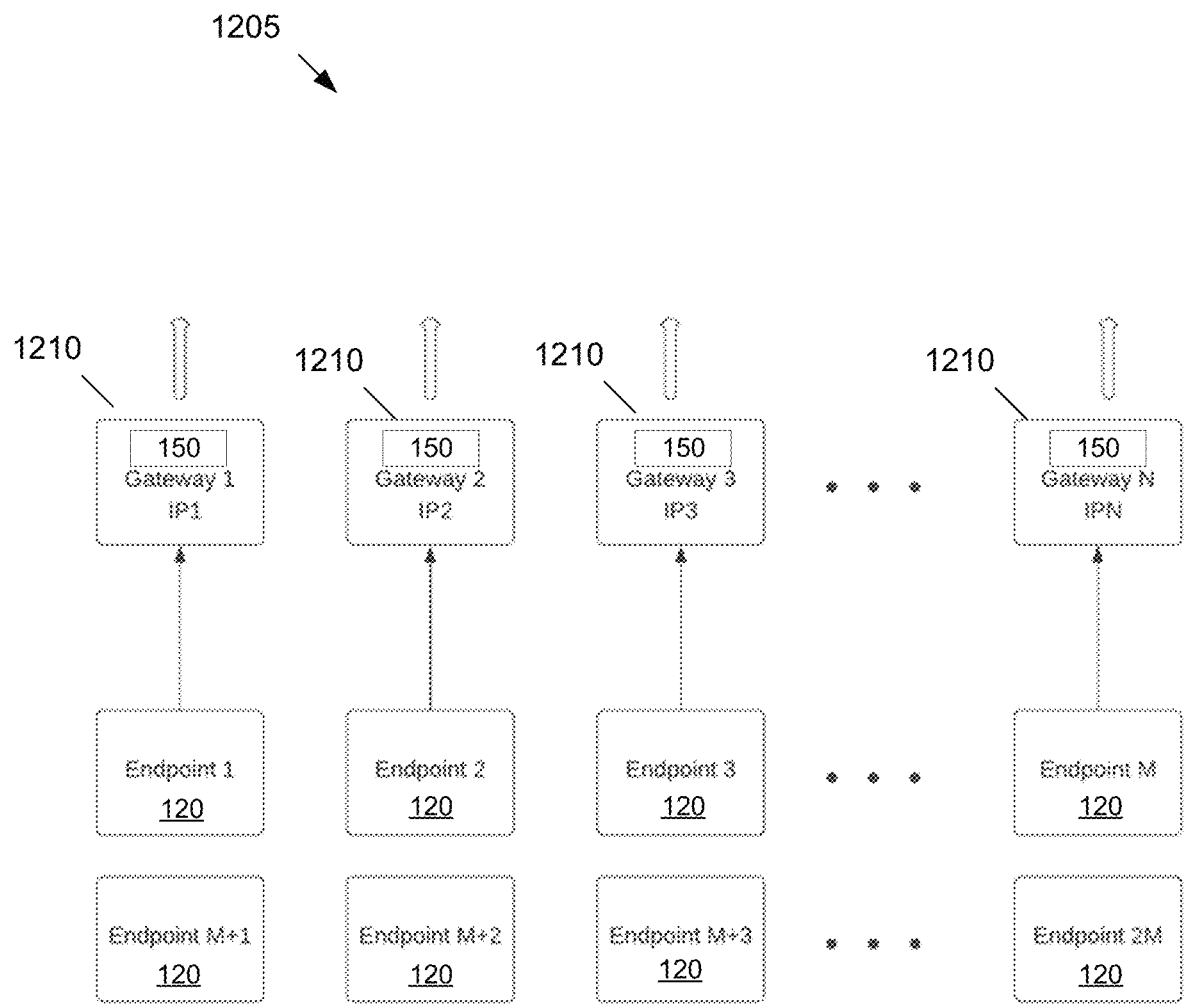
FIG. 12 illustrates an implementation of a high availability cluster with load balancing in accordance with an implementation.
Figure 13:
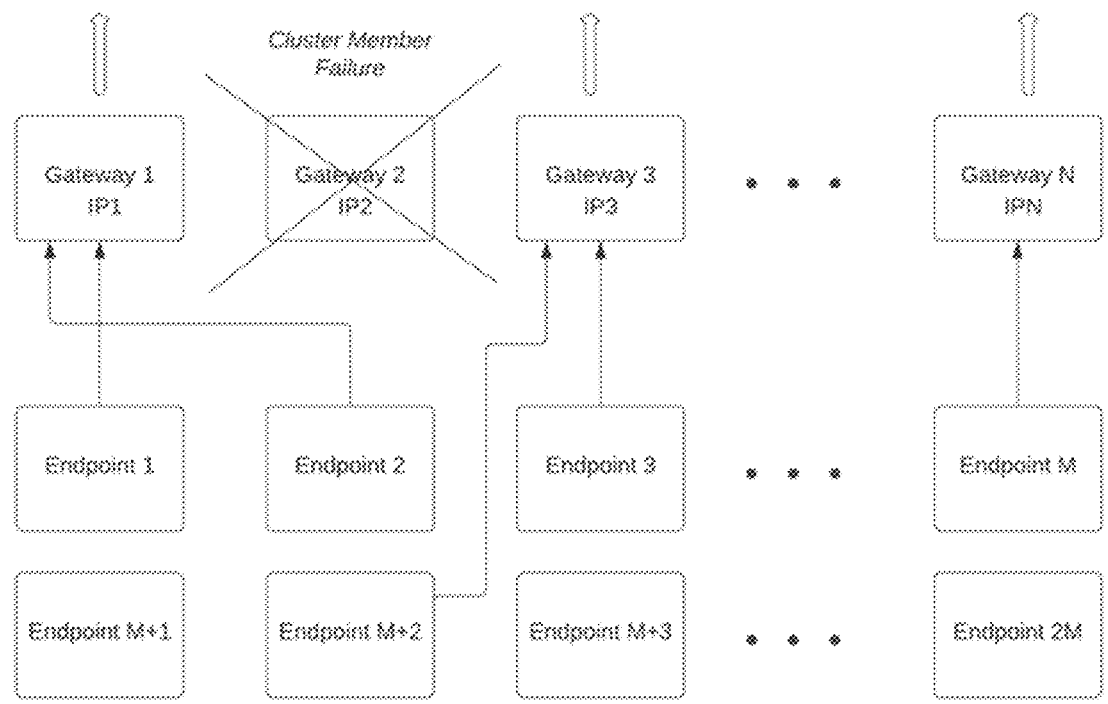
FIG. 13 illustrates an example of a failure of an active gateway of a cluster and a reassignment of endpoint devices of the cluster in accordance with an implementation.

FIGS. 2-11 describe examples of a security appliance to form secure access gateways. FIGS. 12-13 illustrate an example of load balancing a cluster of gateways, in which each gateway may be similar to, or a variation of, the secure access gateways. As discussed below in more detail, each secure access gateway many be implemented using a security appliance that acts to establish a default gateway for a plurality of endpoint devices in which there are point-to-point links between endpoint devices in a VLAN.

Secure Access Gateway

Figure 1:
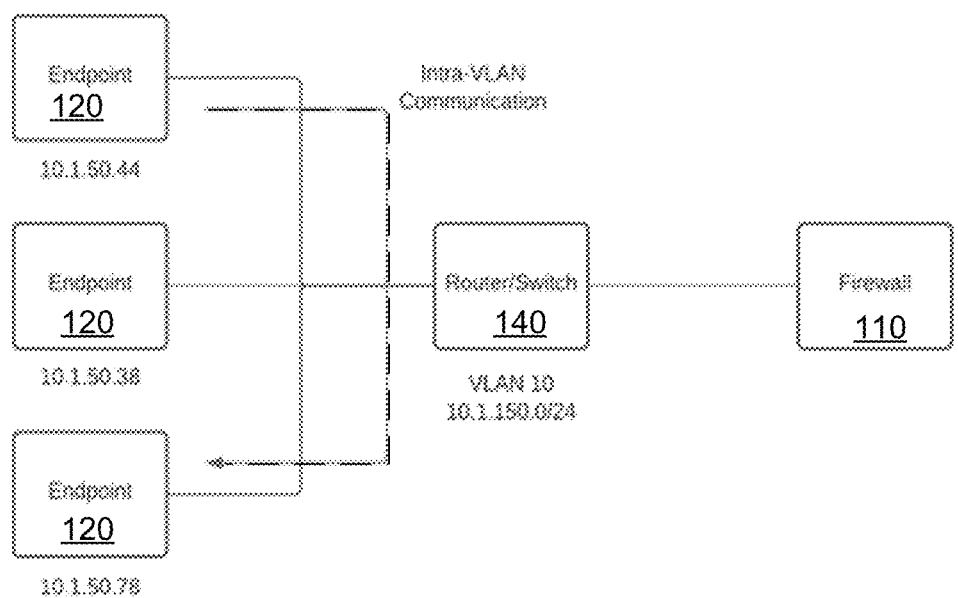
FIG. 1 is a block diagram illustrating Intra-LAN traffic in a conventional VLAN network.
Figure 2:
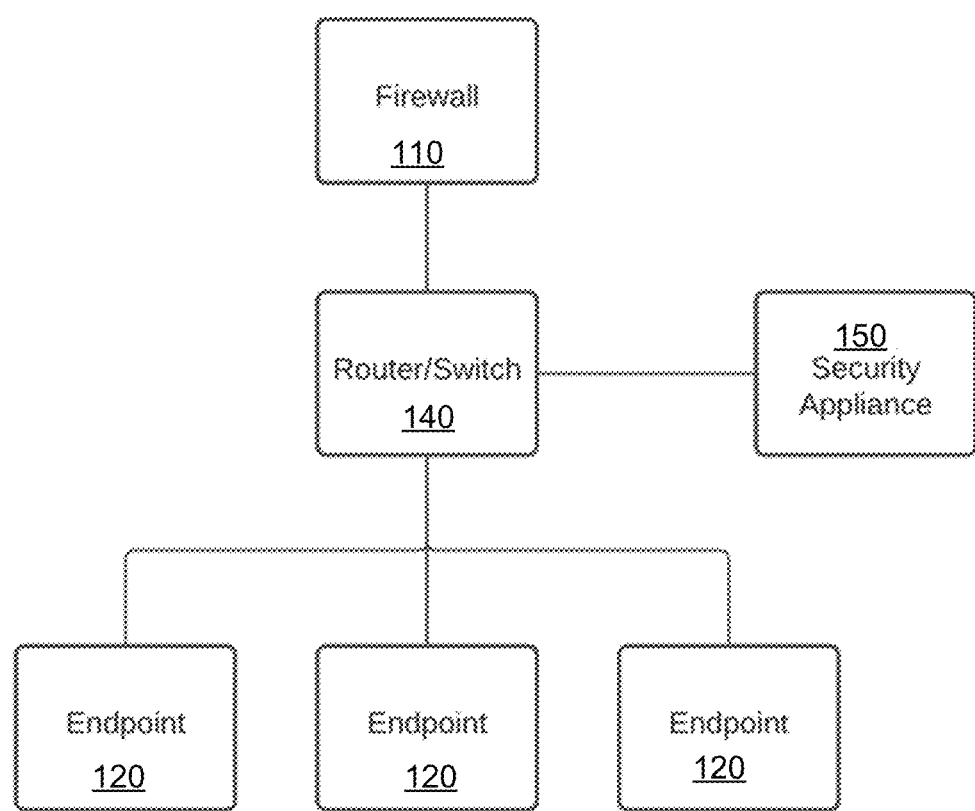
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security appliance 150 may be implemented as software compatible with a virtual machine (VM) implementation, such as within a hypervisor implementation in VMware®. The security appliance may be deployed on a port that allows the security appliance to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point-to-point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) Relay responsible for relaying IP address requests to the DHCP function on the network and overwriting the subnet mask in the response to a subnet mask comprised of all ones—255.255.255.255.

When an individual endpoint 120 requests an IP address, the security appliance 150 sets the security appliance as the default gateway for the endpoint. In one implementation, the security appliance responds with a subnet comprised of all ones—255.255.255.255 and sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255.255.255 puts each device inside its own subnet, which forces them to communicate with the default gateway before communicating with any other device. The 255.255.255.255 subnet mask may also be referred to by the Classless Inter-Domain Routing (CIDR) prefix /32, which has 1 IP address. The CIDR number comes from the number of ones in the subnet mask when converted to binary. The 255.255.255.255 subnet mask corresponds to a CIDR prefix of /32.

Since the security appliance 150 sets itself as the default gateway for the network (by virtue of the subnet mask being comprised of all ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
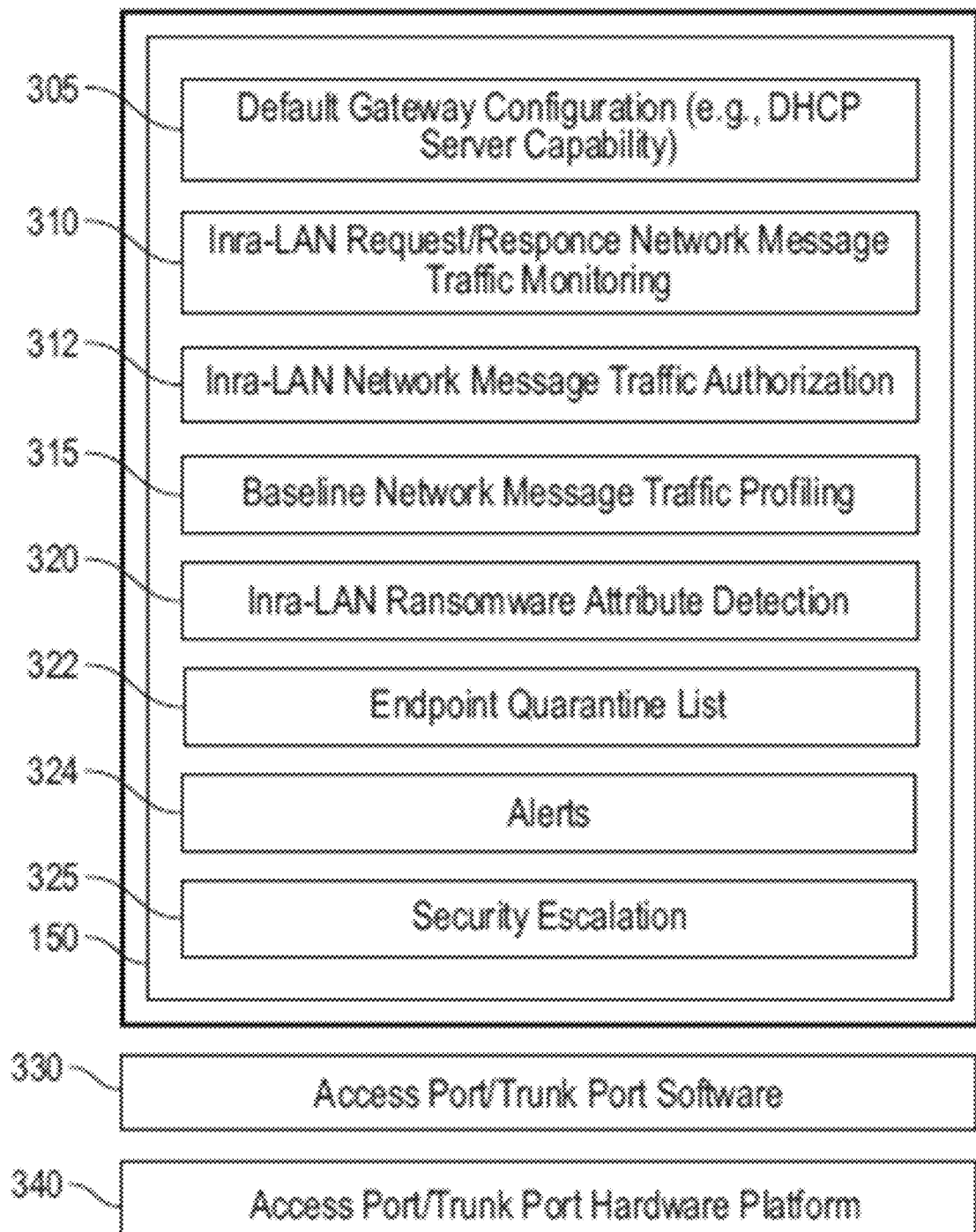
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may be implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 322 to quarantine compromised endpoints. This may include, for example, generating a list of quarantined endpoint devices that are used to block intra-LAN communication for compromised devices (i.e., to stop the lateral movement of ransomware). An alert unit 324 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
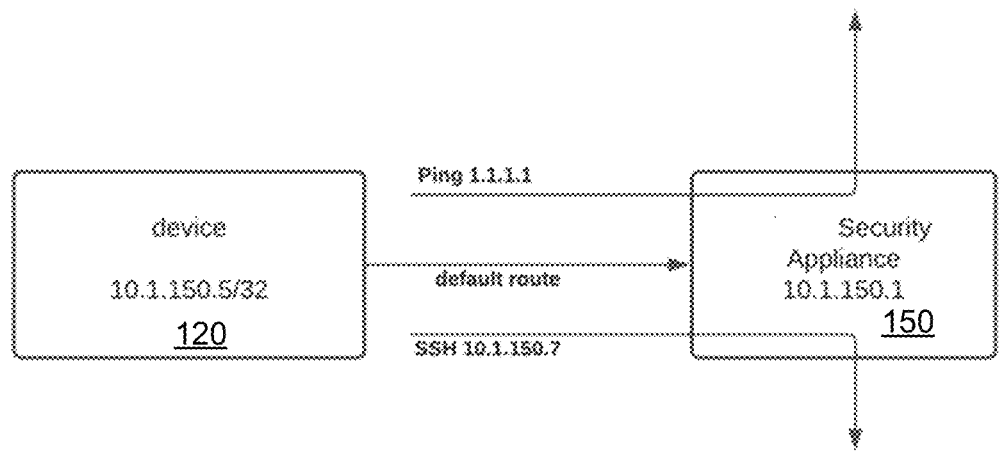
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a /32 subnet is illustrated. However, more generally, a /31 or a /30 subnet may be used. Configuring a /32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
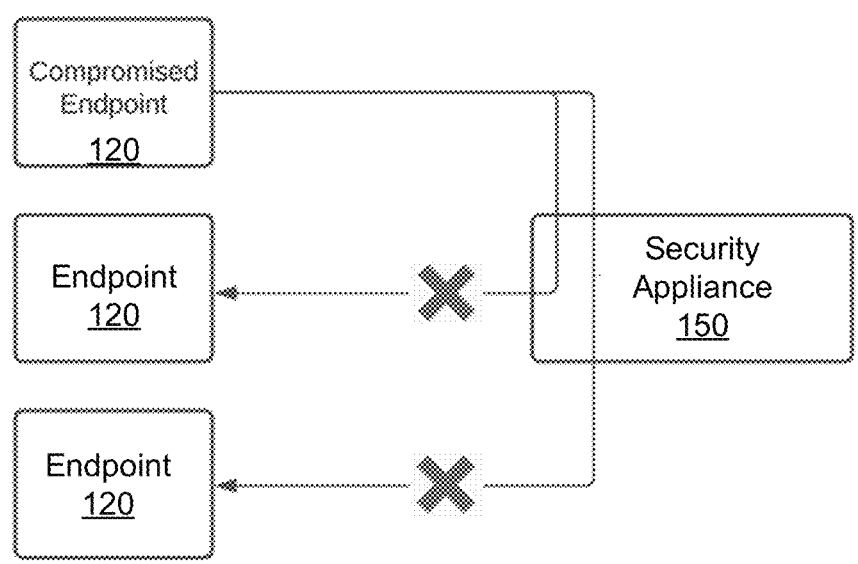
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
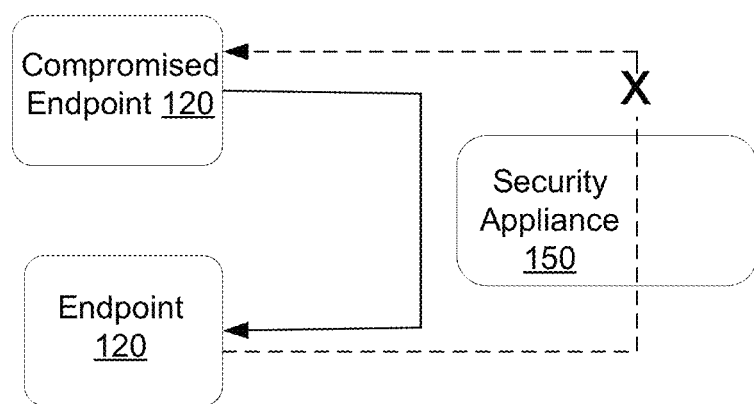
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
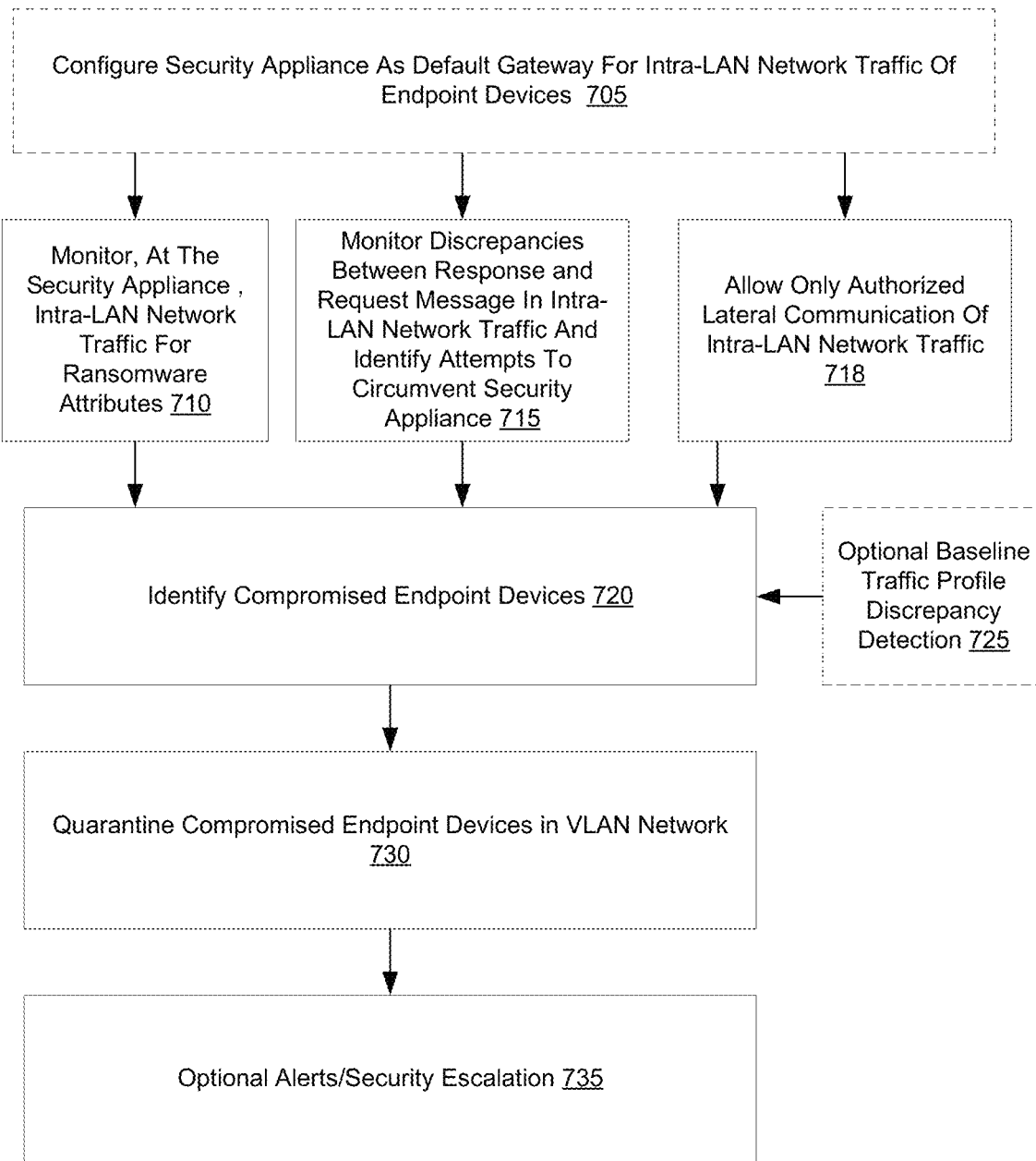
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the /32 default route). The security appliance 150 detects the fact that it has seen a response packet to a request sent by the compromised endpoint, and it alerts the operator in this case. Automatic actions may be taken by the security appliance 150 including quarantining the compromised endpoint so that further lateral propagation is impossible.

As previously discussed, a security appliance may be used to protect device endpoints on a shared VLAN network from lateral propagation of malware and ransomware. However, in some implementations the security appliance 150 may be implemented in different ways. In some end-use scenarios, it may be desirable to implement the security appliance to operate in combination with a conventional original DHCP server. For example, in a deployment of the security appliance to upgrade an existing VLAN network, customers may want to ensure that their original DHCP server continues to operate without any changes to it. Also, in some implementations ensuring a graceful failure mode is a key concern. For example, some customers may want assurance that there is a graceful failure mode in the unlikely event that the security appliance 150 temporarily goes down.

Figure 8:
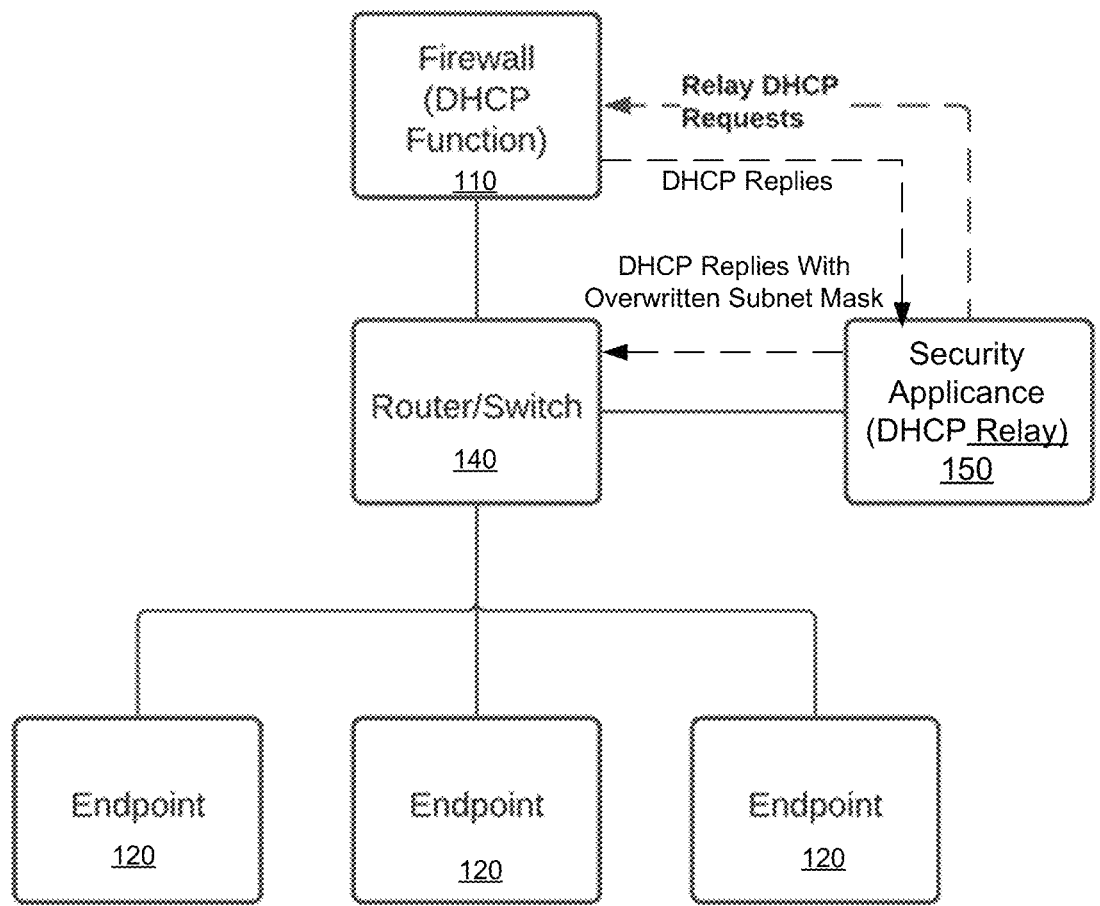
FIG. 8 illustrates an implementation of the security appliance having a DHCP relay function in accordance with an implementation.

FIG. 8 illustrates a deployment architecture in which the security appliance 150 is deployed on a trunk port on the existing router or switch. In this implementation, the security appliance 150 has a DHCP relay function and acts as a DHCP relay for the existing VLAN network. As indicated by the dashed lines, when an endpoint device 120 requests an IP address via a DHCP request, the security appliance 150 acts as a DHCP that relays the DHCP request to the original DHCP server on the network (shown as part of the Firewall function 110). When the response is received from the original DHCP server, the security appliance 150 overwrites the subnet mask in the response with a subnet mask which is comprised of all ones: 255.255.255.255. This results in the security appliance 150 configuring itself as the default gateway for the endpoint by overwriting the router/gateway property in the response. This process continues for all of the endpoints 120 in a VLAN domain. A provisioning or setup process may be optionally used to ensure that all of the endpoint devices request an IP address and use the security appliance as the default gateway.

Figure 9:
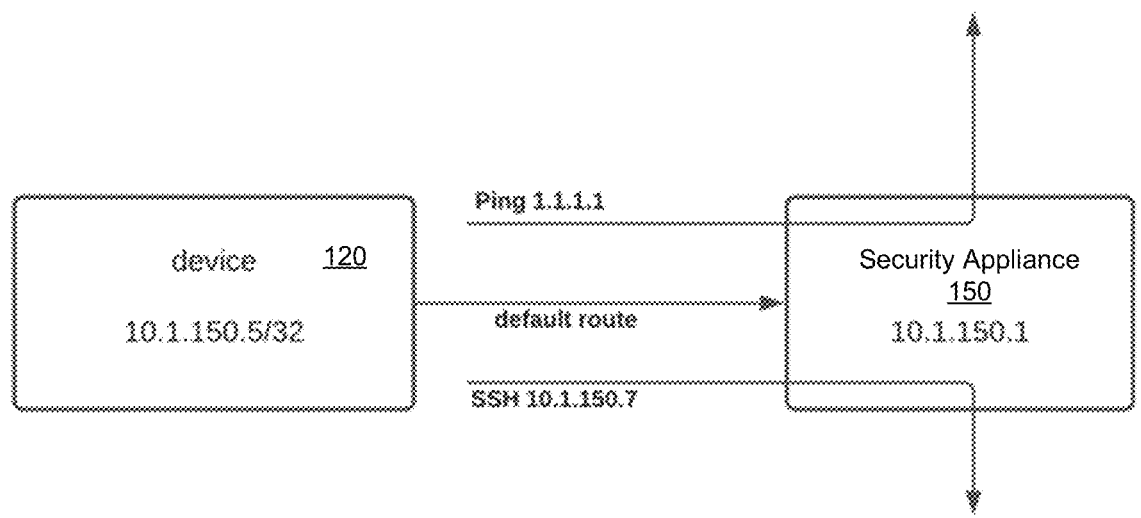
FIG. 9 illustrates a default gateway function in accordance with an implementation.

Since each individual endpoint device receives an IP address with a subnet mask of 255.255.255.255, any network communication with other endpoint devices or internet applications needs to be routed via the default gateway. From the perspective of an individual endpoint, other endpoints, and applications appear to be in a different IP network. Hence all outbound packets are sent to the default gateway as shown in FIG. 9.

Figure 10:
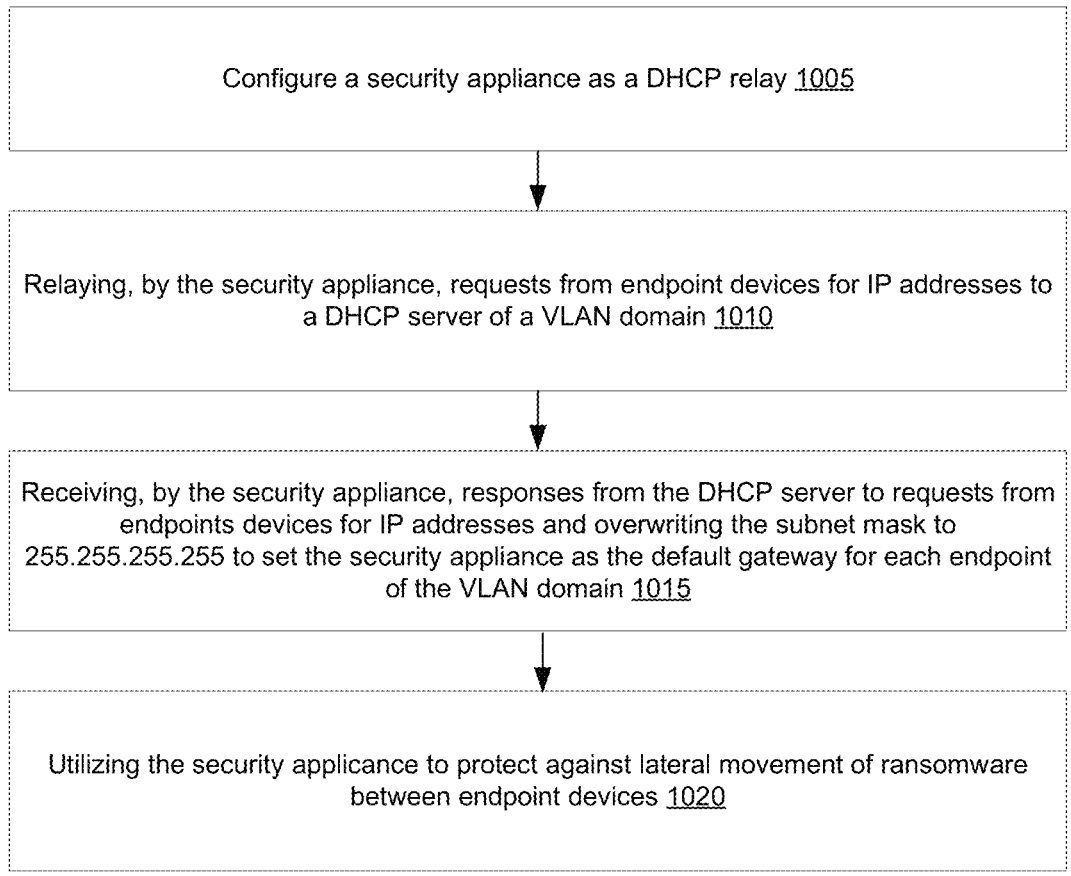
FIG. 10 illustrates a high-level flow chart of a method of using a security appliance with a DHCP relay function to protect against ransomware in accordance with an implementation.

FIG. 10 is a flowchart of a method in accordance with an implementation. In block 1005 a security appliance is configured as a DHCP relay. For example, the security appliance may include a DHCP relay function that is activated when the security appliance is deployed in a VLAN network having a firewall with a DHCP server. In block 1010, in operation the security appliance relays DHCP IP address requests from individual endpoint devices of a VLAN domain to the DHCP server. In block 1015, the security appliance receives DHCP response and overwrites the subnet mask with all ones to 255.255.255.255. This sets the security appliance as the default gateway. In block 1020, the security appliance is used to protect against lateral movement of ransomware between endpoint devices.

Figure 11:
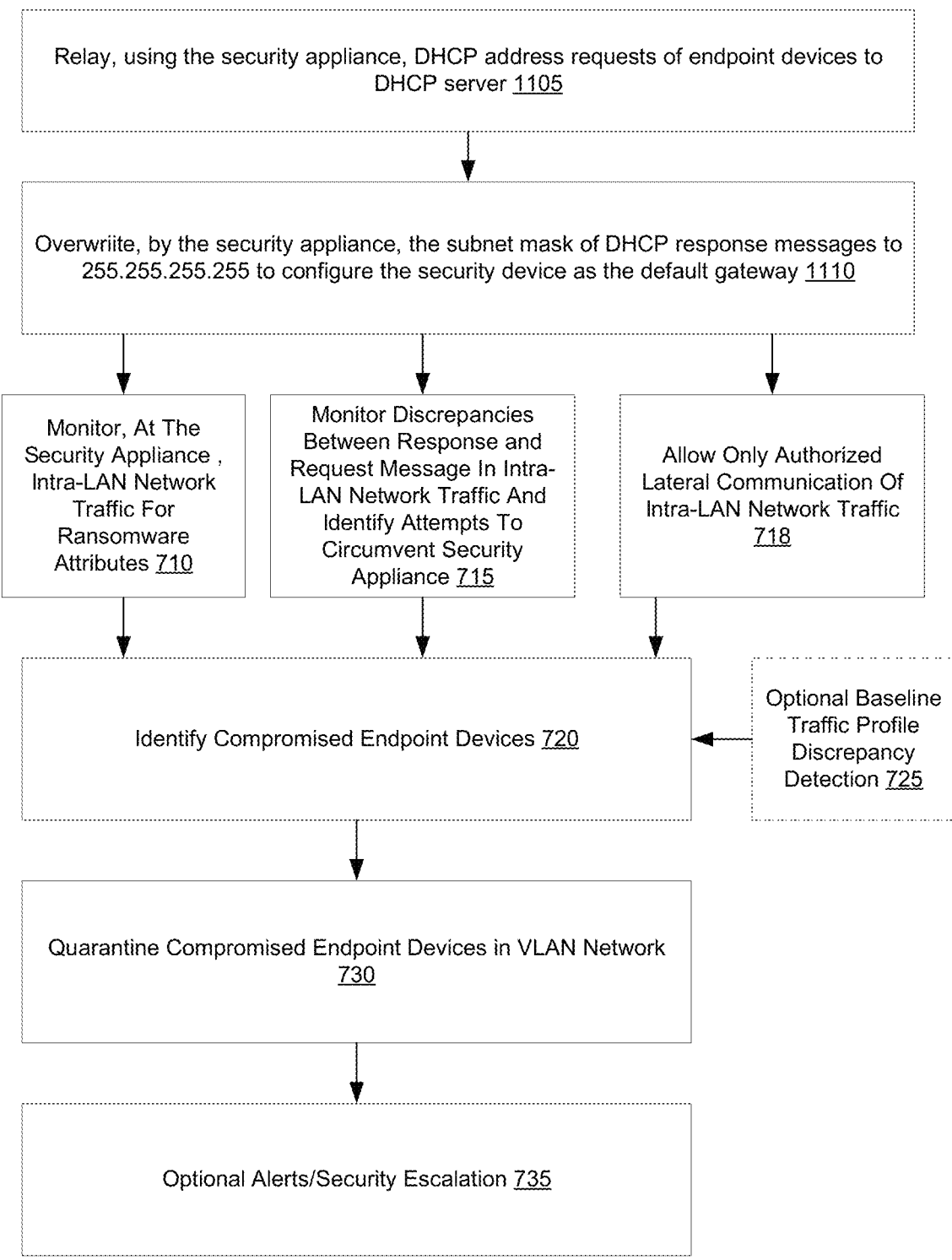
FIG. 11 is a flow chart illustrating how a security appliance with a DHCP relay function can provide a variety of layer of protection similar to that of FIG. 7 in accordance with an implementation.

As illustrated in FIG. 11, the security appliance may be used to implement features described in regard to FIG. 7. The security appliance becomes the default gateway in blocks 1105 and 1110 by virtue in the process of the security appliance relaying DHCP IP address request to the DHCP server (block 1105) and overwriting the subnet mask (block 1110) to set the security appliance as the default gateway.

The particular implementation of the security appliances in FIG. 8 to FIG. 11 increases the overall reliability of the deployment. In the unlikely scenario that the security appliance was to fail, an automated script could reconfigure the network switch so that the original DHCP server assumes the DHCP function in the network. This would ensure seamless downgrade with no downtime.

While failure of the security appliance is an unlikely scenario, ultra-high reliability and graceful failure is important in some end use applications.

Clustering of Gateways for Load Balancing and High Availability

In an Enterprise Network or Industrial/OT environment, there may be a need to balance the traffic load between multiple security appliances to ensure that each security appliance receives an appropriate share of the traffic. Existing solutions for load balancing typically rely on hardware load balancers or software load balancers running on servers. However, these solutions can be expensive, difficult to manage, and may create a single point of failure. Further, these solutions typically load balance client traffic using Layer-3 or Layer-4 protocol attributes (such as the 4-tuple identifying the flow or the client IP address) and are not suited for a solution where the default gateways maintain point-to-point links between endpoints. Hence, there is a need for an efficient and cost-effective method of load balancing traffic in an environment with point-to-point links between the default gateway and endpoint devices.

Referring to FIG. 12, in one implementation, a high availability cluster 1205 of secure access gateways 1210 is illustrated with each gateway having a security appliance 150. The secure access gateways 1210 can be considered to be nodes of the high availability cluster. The cluster as a whole may have a software entity that coordinates the redistribution of traffic. In one implementation a gateway is active if it is functioning normally and able to handle message traffic in a VLAN. A gateway fails if it is not functioning normally and is unable to handle normal message traffic. For the purposes of illustrating load balancing, these two possibilities are considered, although more generally health information about a gateway could be monitored to detect gateways that are candidates for pro-active replacement.

In one implementation, each active gateway supports point-to-point links with a set of endpoint devices. Load balancing is performed. In response to a failure of an individual gateway, the traffic may be redistributed. In one implementation, load balancing is performed of network traffic across multiple security appliances that serve as default gateways in a network environment with point-to-point links between endpoints. The principle of operation of each individual gateway with point-to-point links may be similar to that previously described.

In one implementation, client endpoint devices are assigned to VLANs and an active gateway acts as a DHCP relay, assigning itself as the default gateway to the client device after receiving a DHCP response. In one implementation, multiple gateways (e.g., two or more, but more generally an arbitrary positive whole number, M) form a highly available cluster to boost throughput and resilience.

A variety of different techniques may be used to allocate traffic in the cluster. In one implementation, consistent hashing or other partitioning algorithm is used to distribute traffic from client endpoints among the different gateways that form part of the highly available cluster, with each gateway responsible for handling traffic to and from a specific range of IP addresses or clients (e.g., as illustrated, ranges of IP addresses such as IP1, IP2, IP3 . . . IPM). This ensures even load distribution and resiliency in the face of changes to the system's configuration.

In one implementation, the cluster uses the Virtual Router Redundancy Protocol (VRRP) to elect a master for a particular gateway address, with the master gateway serving all clients assigned to it. VRRP is described in Internet Engineering Task Force (IETF) publication RFC 5798. In case of failure, VRRP selects a new master, and the new node begins serving clients from the previous gateway, as well as its own clients, to avoid sudden degradation of performance. Since each VRRP instance can elect a single master, different instances of VRRP are run on different VLANs, so that mastership can be load balanced amongst cluster members. In this way each cluster member may serve as the VRRP master node for one or more VLANs.

The present invention provides a method for load balancing traffic in a network environment using Security Appliances acting as gateways. The method includes assigning client devices to one of the VLANs in the network environment and using a cluster of gateways to establish point-to-point links to the client devices. In one implementation, each respective default gateway is allocated from a set of gateway IP addresses belonging to N gateways that serve as part of the cluster. At some examples, the allocation can be performed using either a consistent hashing or a static partitioning algorithm. In one implementation, the gateway IP addresses are reserved from the available VLAN subnet pool.

When the client endpoint requests an IP address using the DHCP protocol, the gateway which is acting as the VRRP master relays the DHCP request to the DHCP server. When the DHCP server responds, the gateway overwrites the default gateway IP address and the subnet mask in the response packet. In one implementation, the default gateway is picked by computing a consistent hash of the individual gateway addresses (for those gateways participating in the high availability (HA) cluster) in a round-robin fashion (as described later). The subnet mask is set to 255.255.255.255 to establish point-to-point links between client devices.

In this way each client endpoint gets assigned a different default gateway using a consistent hashing algorithm amongst the cluster members. Subsequent traffic from these client endpoints is redirected to their respective default gateways and gets evenly distributed (or substantially evenly) amongst the cluster members.

In one implementation, consistent hashing is used to re-hash all IP addresses in a range when adding or removing gateways to help to distribute the workload evenly across all available gateways and minimize disruption to existing clients. This implementation does not depend on any partitioning algorithm.

In one implementation, a simple divide-by-N static partitioning of the available IP pool within a VLAN to all available cluster members can alternatively be used. However, this implementation may require more extensive redistribution than other approaches when a given node fails.

Aspects of how this approach handles node failures will now be discussed with regards to FIG. 13. For the purposes of VRRP, each gateway may be considered to be a node. If a cluster node were to fail, the active VRRP instances on other node (for each VLAN) will reassign all client endpoint from the failed cluster gateway to the remaining nodes. When these endpoints renew their IP addresses using the DHCP renew mechanism, they will get assigned existing/new IP addresses with the default gateway partitioned amongst the remaining active cluster nodes. Traffic which was destined to the failed cluster node will transition over to the remaining nodes. In this mechanism, performance degrades gracefully with nodes taking on more and more load as additional nodes start failing.

Some of the advantages of the cluster arrangement is that it provides a cost-effective and efficient method for load balancing traffic in a network environment using gateway nodes to provide additional security against lateral propagation of ransomware. The partitioning of client endpoints amongst available cluster members, ensures that traffic is evenly distributed between all the members. The mechanism also provides for graceful degradation of performance with nodes taking on additional load as other cluster nodes fail.

Alternate Implementations

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system for ransomware protection in a Virtual Local Area Network (VLAN), comprising:
   a high availability cluster having as nodes a plurality of VLAN gateways with point-to-point links with client endpoint devices, with each VLAN gateway having a security appliance acting as a DHCP relay assigning itself as a default gateway for a set of client endpoint devices after receiving a DHCP response;
   wherein the system implements a partitioning algorithm to distribute traffic from client endpoint devices amongst different default gateways to perform load distribution.

2. The system of claim 1, wherein each security appliance overwrites a subnet mask to 255.255.255.255 to set the security appliance as a default gateway for a plurality of endpoint devices.

3. The system of claim 1, wherein the partitioning algorithm is a divide-by-N static partitioning, where N is a number of active gateway nodes in the high availability cluster.

4. The system of claim 1, wherein repartitioning is performed in response to a node failure in the cluster.

5. The system of claim 1 wherein the partitioning algorithm comprises a hashing algorithm.

6. The system of claim 1, wherein a hashing algorithm is used to assign client devices to a range of IP addresses allocated to different gateways to perform load balancing.

7. The system of claim 1, wherein each default gateway is responsible for handling traffic to and from a specific range of IP addresses or clients.

8. The system of claim 1, where the cluster utilizes a Virtual Router Redundancy Protocol (VRRP) to elect a master gateway for a particular gateway address and in the event of a failed master gateway the VRRP selects a new master gateway to service client endpoints of the failed master gateway.

9. The system of claim 8, in which different instances of VRRP run on different VLANs in which mastership is load balanced amongst cluster members.

10. A computer-implemented method of ransomware protection in a Virtual Local Area Network (VLAN), comprising:
    configuring a set of VLAN gateways as nodes as a high availability cluster, each VLAN gateway having a security appliance acting as a DHCP relay assigning itself as a default gateway to a set of client endpoint devices after receiving a DHCP response; and
    partitioning traffic from client endpoint devices to perform load redistribution.

11. The computer-implemented method of claim 10, further comprising overwriting, by the security appliance, a subnet mask to 255.255.255.255 to set the security appliance as a default gateway for a plurality of endpoint devices of the VLAN.

12. The computer-implemented method of claim 10, wherein the partitioning traffic comprises utilizing a divide-by-N static partitioning, where N is a number of active gateway nodes in the cluster.

13. The computer-implemented method of claim 10, further comprising performing repartitioning in response to a node failure in the high availability cluster.

14. The computer-implemented method of claim 10, wherein the partitioning comprises implementing a hashing algorithm.

15. The computer-implemented method of claim 14, wherein the hashing algorithm is used to assign client devices to a range of IP addresses allocated to different gateways to perform load balancing.

16. The computer-implemented method of claim 10, wherein each default gateway is responsible for handling traffic to and from a specific range of IP addresses or clients.

17. The computer-implemented method of claim 11, wherein Virtual Router Redundancy Protocol (VRRP) elects a master gateway for a particular gateway address and in the event of a failed master gateway the VRRP selects a new master gateway to service the client endpoint devices of the failed master gateway.

18. The computer-implemented method of claim 17, in which different instances of VRRP run on different VLANs in which mastership is load balanced amongst cluster members.

* * * * *